(12) United States Patent
Shimada et al.

(10) Patent No.: US 7,568,452 B2
(45) Date of Patent: Aug. 4, 2009

(54) ENGINE SYSTEM

(75) Inventors: Atsushi Shimada, Hitachinaka (JP);
Takao Ishikawa, Hitachi (JP); Takeyuki Itabashi, Yasugi (JP); Hiroshi Kanemoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 11/657,486

(22) Filed: Jan. 25, 2007

(65) Prior Publication Data
US 2007/0209609 A1 Sep. 13, 2007

(30) Foreign Application Priority Data
Mar. 10, 2006 (JP) ............... 2006-065025

(51) Int. Cl.
*F02B 43/08* (2006.01)
*F02B 17/00* (2006.01)
*F02B 13/00* (2006.01)

(52) U.S. Cl. ............... 123/3; 123/295; 123/575
(58) Field of Classification Search ............ 123/3, 123/1 A, 295, 525, 575
See application file for complete search history.

(56) References Cited

U.S. PATENT DOCUMENTS

| | | | | |
|---|---|---|---|---|
| 5,178,118 A * | 1/1993 | Nakamats | ............ | 123/525 |
| 5,297,532 A * | 3/1994 | Ikebe et al. | ............ | 123/564 |
| 6,012,282 A * | 1/2000 | Kato et al. | ............ | 60/274 |
| 6,655,130 B1* | 12/2003 | Kirwan et al. | ............ | 60/284 |
| 6,655,324 B2* | 12/2003 | Cohn et al. | ............ | 123/1 A |
| 7,089,907 B2* | 8/2006 | Shinagawa et al. | ............ | 123/295 |
| 7,111,452 B2* | 9/2006 | Miyoshi et al. | ............ | 60/285 |
| 7,143,577 B2* | 12/2006 | Yoshioka | ............ | 60/285 |
| 7,412,947 B2* | 8/2008 | Shinagawa et al. | ............ | 123/3 |
| 2002/0185086 A1* | 12/2002 | Newman et al. | ............ | 123/1 A |
| 2003/0070425 A1* | 4/2003 | Kokusyo et al. | ............ | 60/295 |
| 2003/0089337 A1* | 5/2003 | Cohn et al. | ............ | 123/435 |
| 2003/0168023 A1* | 9/2003 | Anderson et al. | ............ | 123/3 |
| 2003/0226349 A1* | 12/2003 | Klenk et al. | ............ | 60/274 |

(Continued)

FOREIGN PATENT DOCUMENTS

CA 1 146 725 A 5/1983

(Continued)

OTHER PUBLICATIONS

European Search Report dated Jun. 26, 2007 (Six (6) Pages).

*Primary Examiner*—Stephen K Cronin
*Assistant Examiner*—Sizo B Vilakazi
(74) *Attorney, Agent, or Firm*—Crowell & Moring LLP

(57) ABSTRACT

An object of the invention is to provide an engine system driving an engine by using a hydrogen rich gas generated from a medium chemically repeating a hydrogen absorption and a hydrogen desorption as one of fuels, in which the engine system can efficiently generate a hydrogen rich gas from the medium. In an engine system which mounts a medium chemically repeating a hydrogen absorption and a hydrogen desorption thereon, is provided with a hydrogen supplying apparatus generating or storing a hydrogen rich gas from the medium, and drives an engine by using the hydrogen rich gas as one of fuels, the engine system has a detecting portion detecting an operating state of the engine, and a medium supplying amount control means controlling a supplying amount of the medium supplied to the hydrogen supplying apparatus in correspondence to a result of detection of the detecting portion.

1 Claim, 10 Drawing Sheets

U.S. PATENT DOCUMENTS

| | | | |
|---|---|---|---|
| 2004/0045514 A1* | 3/2004 | Qian et al. | 123/3 |
| 2005/0155344 A1* | 7/2005 | Kobayashi | 60/286 |
| 2005/0224042 A1* | 10/2005 | Shinagawa et al. | 123/295 |
| 2007/0028905 A1* | 2/2007 | Shinagawa et al. | 123/575 |
| 2007/0039588 A1* | 2/2007 | Kobayashi | 123/304 |
| 2007/0151527 A1* | 7/2007 | Shinagawa et al. | 123/3 |
| 2008/0060616 A1* | 3/2008 | Ito | 123/436 |

FOREIGN PATENT DOCUMENTS

| | | |
|---|---|---|
| DE | 199 31 104 A1 | 1/2001 |
| FR | 2 860 455 A1 | 4/2005 |
| GB | 23184 | 12/1904 |
| JP | 2000-213444 A | 8/2000 |
| JP | 2005-147124 | 6/2005 |
| WO | WO 03/042521 A2 | 5/2003 |

* cited by examiner

FIG.7

| | | |
|---|---|---|
| SMALL | HEAT SUPPLY AMOUNT TO HYDROGEN SUPPLYING APPARATUS | LARGE |
| SMALL | EXHAUST GAS FLOW RATE SUPPLIED TO HYDROGEN SUPPLYING APPARATUS | LARGE |
| EARLY | IGNITION TIMING | SLOW |
| SLOW | EXHAUST VALVE OPENING TIMING | EARLY |
| SMALL | BURNER HEATING AMOUNT TO HYDROGEN SUPPLYING APPARATUS | LARGE |
| SMALL | SUPPLY AMOUNT OF INVERTER HEAT TO HYDROGEN SUPPLYING APPARATUS | LARGE |

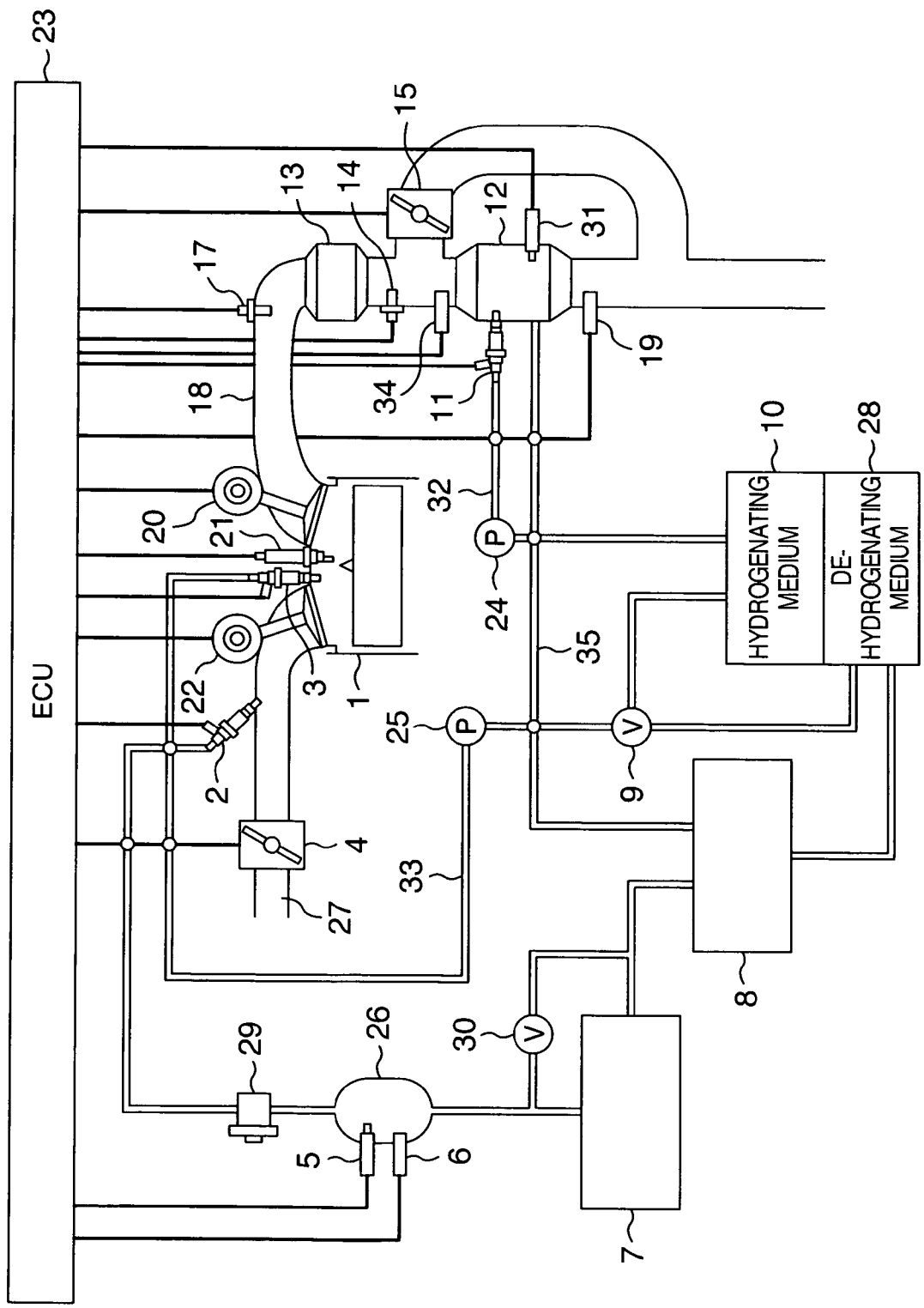

ENGINE SYSTEM

BACKGROUND OF THE INVENTION (1) Field of the Invention

The present invention relates to a hydrogen engine system in which a medium chemically repeating a hydrogen absorption and a hydrogen desorption is mounted.

(2) Description of Related Art

As a conventional system driving an engine by using a hydrogen rich gas generated from a medium chemically repeating a hydrogen absorption and a hydrogen desorption as one of fuels, there is disclosed a hydrogen utilizing internal combustion engine which can supply the medium mentioned above to an engine in addition to the hydrogen rich gas generated from the medium mentioned above, and can independently supply both of them to the engine, for example, as described in patent document 1.

Patent Document 1: JP-A-2005-147124

In an engine system using a hydrogen rich gas generated from a medium chemically repeating a hydrogen absorption and a hydrogen desorption as one of fuels, and driving an engine only by the hydrogen rich gas or by plural kinds of fuels, the engine is driven by storing the hydrogen rich gas generated from the medium in a buffer tank and supplying the hydrogen rich gas stored in the buffer tank to the engine. In order to stably drive the engine, it is preferable to increase a capacity of the buffer tank so as to prevent the hydrogen rich gas from coming short. However, in order to make the engine system compact and light, it is desirable to make the buffer tank compact. In order to make the buffer tank compact, it is important to efficiently generate the hydrogen from the medium as occasion demands. An amount of the hydrogen rich gas generated from the medium is changed in accordance with a medium supplying amount to a catalyst and a temperature of a catalyst material. Since the catalyst temperature is fluctuated in accordance with an operating state of the engine, a reacting amount at a time of generating the hydrogen from the medium, a deterioration state of the catalyst or the like, an amount of the generated hydrogen rich gas is fluctuated in correspondence thereto. In accordance with this, there is generated a state in which a necessary amount of hydrogen rich gas is not generated, and it is hard to execute a linear response to a demanded output of the engine. Accordingly, in order to operate the engine system at a high efficiency, it is necessary to execute a control while taking into consideration the medium supplying amount to the catalyst and the temperature of the catalyst material in correspondence to the operating state of the engine. Further, this problem is similarly generated in the case of using plural kinds of fuels while cutting and separating, it is desirable to select a fuel aspect in correspondence to the demanded output characteristic of the engine or the like, and it is important to efficiently generate the hydrogen rich gas from the medium.

Further, in the case of using the hydrogen rich gas and the medium as the fuel, it is necessary to execute a control while taking into consideration a combustion efficiency and an exhaust performance.

In the system described in the patent document 1, no sufficient study is made about this point.

BRIEF SUMMARY OF THE INVENTION

An object of the present invention is to provide an engine system driving an engine by using a hydrogen rich gas generated from a medium chemically repeating a hydrogen absorption and a hydrogen desorption as one of fuels, in which the engine system can efficiently generate a hydrogen rich gas from the medium.

Further, the other object of the present invention is to provide an engine system which is excellent in a combustion efficiency and an exhaust performance.

In accordance with a first means for achieving the object, there is provided an engine system which mounts a medium chemically repeating a hydrogen absorption and a hydrogen desorption thereon, is provided with a hydrogen supplying apparatus generating or storing a hydrogen rich gas from the medium, and drives an engine by using the hydrogen rich gas as one of fuels, comprising:

a detecting portion detecting an operating state of the engine; and a medium supplying amount control means controlling a supplying amount of the medium supplied to the hydrogen supplying apparatus in correspondence to a result of detection of the detecting portion. In this case, the operating state of the engine can be judged by an engine estimated torque and an engine rotational speed.

Further, in accordance with a second means, there is provided an engine system having at least one of a catalyst temperature estimating means estimating a temperature of a catalyst within the hydrogen supplying apparatus, and a medium supplying amount control means controlling a supplying amount of the medium supplied to the hydrogen supplying apparatus or a heat supplying amount control means controlling a supplying amount of a heat supplied to the hydrogen supplying apparatus, on the basis of the catalyst temperature estimated by the catalyst temperature estimating means.

In accordance with the second means, it is possible to adjust the catalyst temperature by controlling any one of the supplying amount of the medium supplied to the hydrogen supplying apparatus and the supplying amount of the heat supplied to the hydrogen supplying apparatus. Accordingly, since it is possible to control the catalyst temperature in an effective temperature range for generating the hydrogen rich gas under a state in which the engine is driven, it is possible to efficiently generate the hydrogen from the medium.

Further, in order to achieve the second object mentioned above, in accordance with a third means, there is provided an engine system provided with a hydrogen supplying apparatus generating a hydrogen rich gas from a medium chemically repeating a hydrogen absorption and a hydrogen desorption, and a three-way catalyst for purifying an exhaust gas, and driving an engine by using the hydrogen rich gas and the medium as one of fuels, comprising:

an ignition timing control means controlling an ignition timing by a spark plug provided in the engine in correspondence to a supplying amount rate of the medium and the hydrogen rich gas supplied to the engine; and an excess air ratio control means controlling an excess air ratio of the fuel supplied to the engine, wherein the excess air ratio is controlled in a range between 0.95 and 1.05 or between 1.8 and 5.0 by the excess air ratio control means.

Further, in accordance with a fourth means, there is provided an engine system, wherein an exhaust pipe of the engine is provided with the hydrogen supplying apparatus and a purifying catalyst for purifying an exhaust gas of the engine, and the purifying catalyst is installed closer to the engine than the hydrogen supplying apparatus, or the hydrogen supplying apparatus and the purifying catalyst are integrally formed.

Further, in accordance with a fifth means, there is provided an engine system comprising:

a hydrogen rich gas supplying apparatus supplying a hydrogen rich gas as a fuel to an engine;

a medium fuel supplying apparatus directly supplying a component including the medium into a cylinder; and a fuel supply timing control means supplying the component including the medium into the cylinder during a piston compression period so as to execute an autoignition combustion, after supplying the hydrogen rich gas to the engine.

In accordance with the present invention, it is possible to provide the engine system which can efficiently generate the hydrogen rich gas from the medium, in the engine system mounting the medium chemically repeating the hydrogen absorption and the hydrogen desorption thereon.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 7 is a view showing each of methods for controlling a heat supplying amount to the hydrogen supplying apparatus;

FIG. 14 is a system schematic view of a compression ignition combustion type engine system in which the hydrogen supplying apparatus is installed to an exhaust pipe.

DETAILED DESCRIPTION OF THE INVENTION

A description will be given below of an embodiment in accordance with the present invention with reference to the accompanying drawings.

Figure 1:
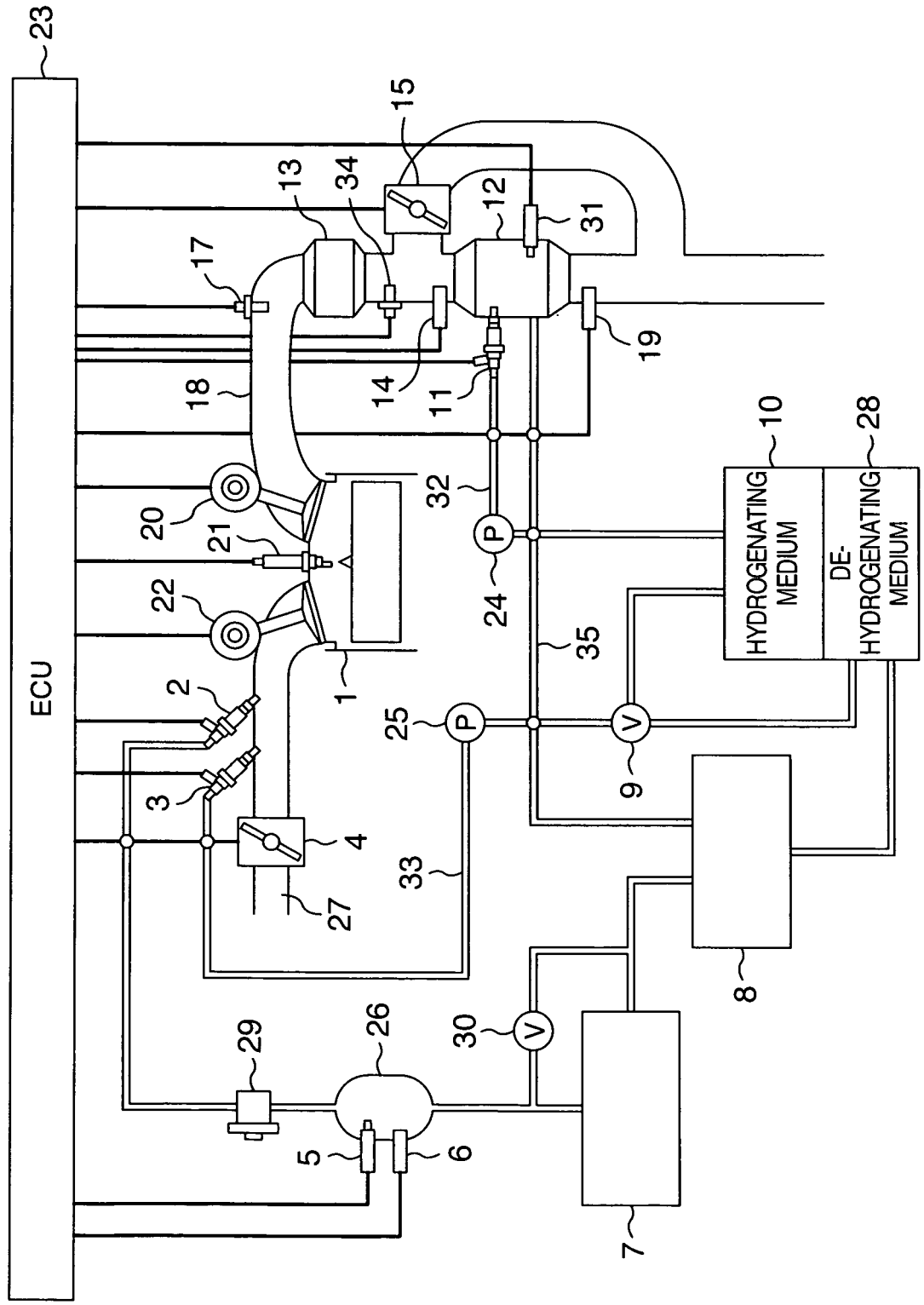
FIG. 1 is a schematic view of an engine system in which a hydrogen supplying apparatus is installed to an exhaust pipe.

FIG. 1 shows a system which can utilize a heat of an exhaust gas discharged from an engine 1 by installing a hydrogen supplying apparatus 12 for executing a dehydrogenation reaction of a medium chemically repeating a hydrogen absorption and a hydrogen desorption in an exhaust pipe 18 of the engine. An amount of the exhaust gas supplied to the hydrogen supplying apparatus 12 can be adjusted by using an exhaust gas amount adjusting valve 15. Further, temperature detecting means 14, 19 and 31 are respectively installed in an upstream side and a downstream side of the hydrogen supplying apparatus 12, and within the hydrogen supplying apparatus 12. A hydrogenating medium is supplied to the hydrogen supplying apparatus 12 by a hydrogenating medium supplying apparatus 11.

The medium mentioned above includes a hydrocarbon fuel such as a gasoline, a diesel oil, a kerosene, a heavy oil, a Decalin, a cyclohexane, a methyl cyclohexane, a naphthalene, a benzene, a toluene and the like and a mixed fuel thereof, a hydrogen peroxide, an ammonia, a nitrogen, an oxygen and the like as far as it can chemically absorb and desorb the hydrogen. Above all, the medium chemically storing the hydrogen is called as a hydrogenating medium, and the medium after chemically desorbing the hydrogen is called as a dehydrogenating medium. The hydrogenating medium and the dehydrogenating medium are respectively stored within tanks 10 and 28. These tanks may be integrally structured. The hydrogenating medium is structured such as to be capable of being supplied to the hydrogen supplying apparatus 12 from a medium supplying apparatus (an injector) 11 through a piping 32 on the basis of a pressure of a pump 24. Further, the hydrogenating medium and the dehydrogenating medium are structured such as to be capable of being supplied to the engine 1 from a hydrogenating medium supplying apparatus (an injector) 3 through a piping 33 on the basis of a pressure of a pump 25. Further, the hydrogenating medium and the dehydrogenating medium supplied to the engine 1 can be switched by using a switching valve 9.

A mixed body of a hydrogen rich gas generated by the hydrogen supplying apparatus 12 and the dehydrogenating medium is carried to a separating apparatus 8 through a piping 35, and is separated into a hydrogen rich gas and a dehydrogenating fuel by the separating apparatus 8. Thereafter, the hydrogen rich gas is stored in a hydrogen rich gas storage apparatus 26 through a suction and compression apparatus 7, and is supplied to the engine 1 from a hydrogen rich gas supplying apparatus (an injector) 2. On the other hand, the dehydrogenating medium is stored within the dehydrogenating medium tank 28. Further, a hydrogen pressure sensor 5 and a hydrogen concentration sensor 6 are installed within a hydrogen rich gas storage apparatus 26 arranged between the separating apparatus 8 and the engine 1. Further, a regulator 29 for controlling a hydrogen rich gas supply pressure to a desired pressure is provided between the hydrogen rich gas storage apparatus 26 and the hydrogen rich gas supplying apparatus (the injector) 2. Further, it is possible to adjust a hydrogen supply pressure by opening and closing a relief valve 30 in such as manner as to prevent the hydrogen supply pressure from the suction and compression apparatus 7 from becoming excessive. A throttle valve 4 adjusting an intake air amount is installed in an intake pipe 27 of the engine 1, and oxygen sensors 17 and 34 are installed in an upstream side and a downstream side of a purifying catalyst 13, in the exhaust pipe 18. The oxygen sensor 17 mentioned above may be replaced by an air fuel ratio sensor. An intake valve 22 and an exhaust valve 20 of the engine 1 may be structured such as to be capable of variably controlling an opening and closing timing and a lift amount.

In the present system, the temperature detecting means 14, 19 and 31, the medium supplying apparatuses (the injector) 3 and 11, the hydrogen rich gas supplying apparatus (the injector) 2, the hydrogen pressure sensor 5, the hydrogen concentration sensor 6, the throttle valve 4, the O2 sensors 17 and 34, the intake valve 22, the exhaust valve 20, the ignition plug 21, the exhaust gas amount adjusting valve 15 and the like are electrically connected to a control apparatus (ECU) 23, and are controlled by the control apparatus 23.

Figure 2:
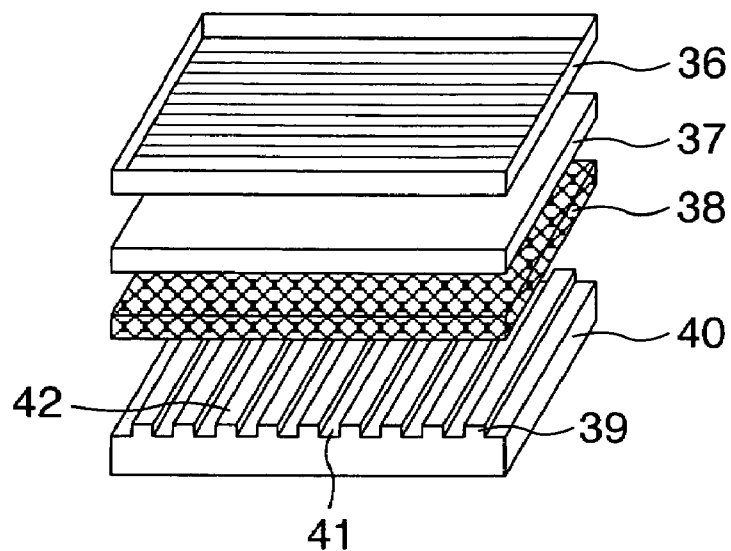
FIG. 2 is a schematic view of the hydrogen supplying apparatus.

Next, a description will be given of a structure of the hydrogen supplying apparatus 12 shown in FIG. 1 with reference to FIG. 2. The hydrogen supplying apparatus 12 is structured, as described in FIG. 2, such that a catalyst layer 42 constituted by a Pt/alumina catalyst is formed on a high heat conduction substrate 40 provided with a flow path projection 39 and made of a pure aluminum (heat conductivity: 250 W/mK). A basic structure is set to a structure in which a hydrogen separating film 38 selectively transmitting only the hydrogen is laminated on the catalyst layer 42, and a hydrogen flow path 36 is laminated via spacer 37, and the hydrogen supplying apparatus 12 is installed in an engine exhaust pipe.

The medium supplied to the hydrogen supplying apparatus 12 passes through a fuel flow path 41, a dehydrogenating reaction makes progress while being in contact with the catalyst layer 42 formed on the surface of the high heat conduction substrate 40, and a hydrogen rich gas is generated. The generated hydrogen rich gas transmits the hydrogen separating film 38, and is discharged from the hydrogen supplying apparatus 12 from the hydrogen flow path 36 via the spacer 37. Further, the hydrogen rich gas and the dehydrogenating medium which do not transmit the hydrogen separating film 38 are discharged out of the hydrogen supplying apparatus 12 from the hydrogen supplying apparatus 12 through the fuel flow path 41. In this case, the discharged hydrogen rich gas and the dehydrogenating medium are combined with the hydrogen rich gas discharged from the hydrogen flow path 36 so as to be mixed, thereby being supplied to the separating apparatus 8 in FIG. 1. In this case, the structure may be made such that the hydrogen rich gas discharged from the hydrogen flow path 36, the hydrogen rich gas discharged from the fuel flow path 41 and the dehydrogenating medium are not mixed, the hydrogen rich gas is supplied to the hydrogen rich gas storage apparatus 26, and the hydrogen rich gas and the dehydrogenating medium are supplied to the separating apparatus 8, via independent pipings. Further, in FIG. 2, the structure is made such that the hydrogen separating film 38 is provided for efficiently executing the dehydrogenating reaction from the medium at a low temperature, however, the structure may be made such that the hydrogen separating film 38 is not provided. Further, the basic structure shown in FIG. 2 may be laminated.

Figure 3:
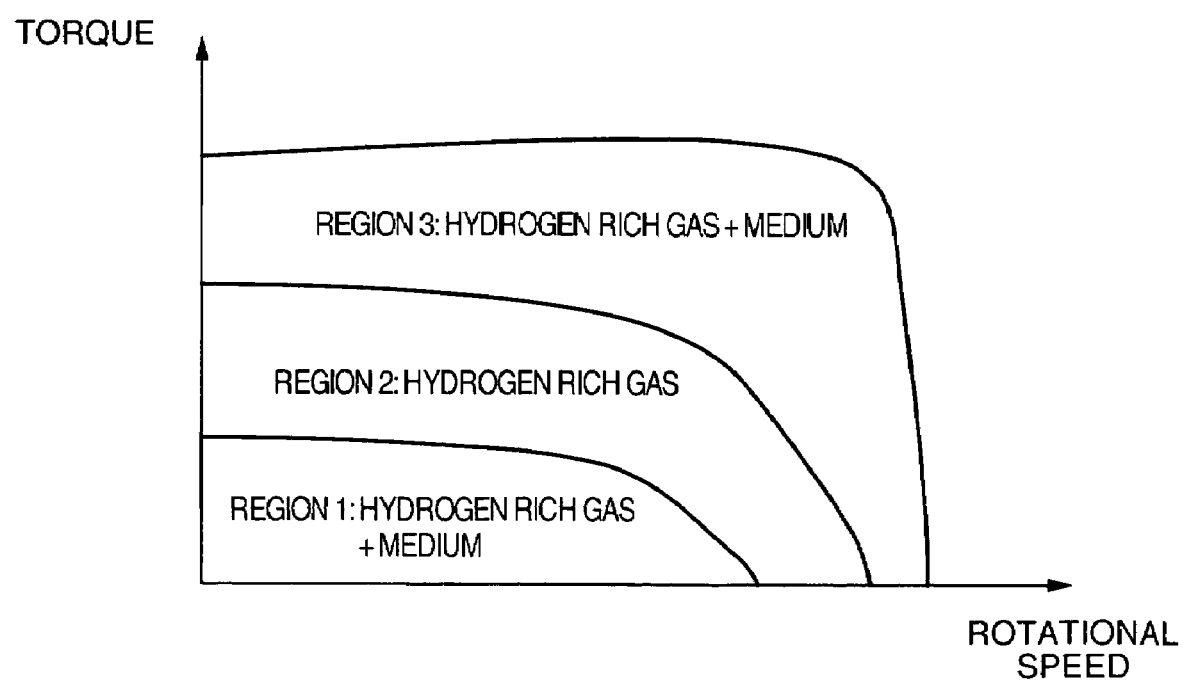
FIG. 3 is a view of a relation between an operating region of an engine and a supplied fuel.

A supply amount of the hydrogenating medium to the hydrogen supplying apparatus 12 depends on a demanded hydrogen amount to the engine which is determined in accordance with an operating state of the engine. A description will be given of a supply method of the hydrogen rich gas and the medium in the engine operating state with reference to FIG. 3. Since the exhaust gas temperature is comparatively low in a low load operation region in a region 1, a heat quantity from the exhaust gas supplied to the hydrogen supplying apparatus 12 becomes small. Accordingly, it is hard to generate an amount of the hydrogen rich gas necessary for driving the engine only by the hydrogen rich gas by the hydrogen supplying apparatus 12. Therefore, both of the medium and the hydrogen rich gas are supplied to the engine. Further, in a high load operation region in a region 3, there is a problem that a pressure increase caused by the combustion within the engine is rapidly generated in the case that only the hydrogen rich gas is supplied to the engine. Accordingly, even in this operation region, it is desirable to supply both of the hydrogen rich gas and the medium to the engine 1. At this time, it is possible to suppress the rapid pressure increase in accordance with an EGR control. Further, a torque assist by a motor may be executed in place of the supply of the medium to the engine. It is possible to drive the engine only by the hydrogen rich gas in a middle load operation region in a region 2 corresponding to an intermediate region of the region 1 and the region 3. As mentioned above, the supply amount of the hydrogen rich gas is determined in correspondence to the operation state of the engine, and the supply amount of the hydrogenating medium supplied to the hydrogen supplying apparatus 12 is determined in accordance therewith. As mentioned above, the system is established in a wide operation region by controlling the fuel supplied to the engine 1 in each of the operation regions.

As the medium supplied to the engine, the dehydrogenating medium is desirable. Because a total calorific power of the dehydrogenating medium and the hydrogen rich gas supplied to the hydrogen supplying apparatus 12 is higher than a calorific power of the hydrogenating medium supplied to the hydrogen supplying apparatus 12. For example, in a reaction for generating the hydrogen and a benzene corresponding to the dehydrogenating medium from a cyclohexane corresponding to the hydrogenating medium, the calorific power is improved at 5.6%. Accordingly, there can be obtained effects that a total efficiency is increased, a CO2 reduction is achieved, and a fuel consumption is improved for a user.

As mentioned above, the fuel supplied to the engine 1 is determined in correspondence to each of the operation regions, and a necessary amount of the hydrogen rich gas is determined. At this time, it is preferable to judge a necessary amount of the hydrogen rich gas by detecting an engine estimated torque and an engine speed. In this case, the engine estimated torque is estimated on the basis of a throttle opening degree or an intake air amount and the engine speed at a time of a stoiciometry operation (excess air ratio=1). At a time of a lean operation, it is estimated on the basis of a fuel supply amount in addition to the throttle opening degree or the intake air amount and the engine speed. Further, in addition to them, the torque may be determined by measuring a combustion pressure within an engine cylinder and a shaft torque. In this case, the intake air amount is measured by an air flow sensor or the like. In the case of executing an exhaust gas recirculation (EGR), the torque estimation is executed by taking an EGR valve opening degree into consideration. Further, at a time of controlling the intake air amount on the basis of an opening period of the intake valve and a lift amount thereof, the torque may be estimated by taking them into consideration. A description will be given below of a control method in correspondence to the operation state of the engine.

The amount of the hydrogen rich gas necessary for the engine is determined on the basis of the operation state of the engine, that is, the engine estimated torque and the engine speed. An amount of the hydrogenating medium supplied to the hydrogen supplying apparatus 12 is determined on the basis thereof. This is because the amount of the hydrogen rich gas generated from the hydrogen supplying apparatus 12 depends on the supply amount of the hydrogenating medium supplied to the hydrogen supplying apparatus 12. The supply amount of the hydrogenating medium is controlled in accordance with a pulse control by the hydrogenating medium supplying apparatus 11. At this time, the supply amount of the hydrogenating medium is controlled by controlling a pulse width and a pulse frequency. Since a response speed is equal to or less than 10 ms until a generating time of the hydrogen rich gas from a supply timing of the hydrogenating medium supplied to the hydrogen supplying apparatus 12, it is possible to make the hydrogen rich gas storage apparatus 26 compact or it is possible to do away with the hydrogen rich gas storage apparatus 26, by using the control mentioned above. Accordingly, there is obtained an effect that it is possible to achieve a compactness of a whole of the system.

Figure 4:
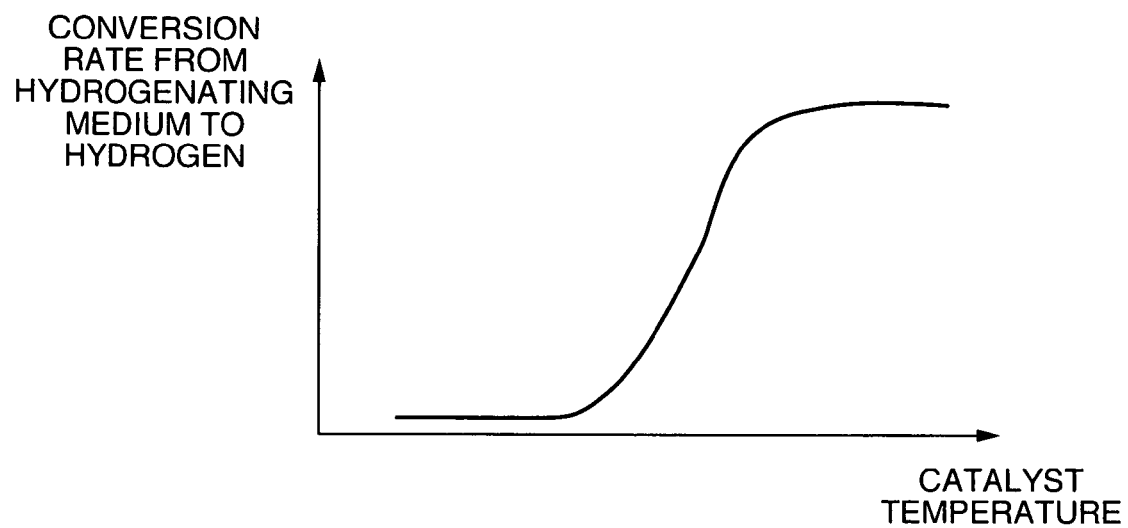
FIG. 4 is a view of a relation between a catalyst temperature and a conversion rate.

Next, as one of the characteristics at a time of generating the hydrogen from the hydrogenating medium, there is such a characteristic as shown in FIG. 4. This is a view showing that the conversion rate to the hydrogen from the hydrogenating medium largely depends on the temperature of the catalyst within the hydrogen supplying apparatus 12. If the catalyst temperature mentioned above becomes equal to or more than a predetermined temperature, the conversion rate becomes close to 100%. In other words, in order to efficiently take out the hydrogen from the hydrogenating medium, it is necessary to make the temperature of the catalyst equal to or more than a predetermined temperature. Further, if the temperature of the catalyst within the hydrogen supplying apparatus 12 is too high, there are such problems as a catalyst deterioration, a damage of a material, a carbonization of the hydrogenating medium and the like. In other words, it is important for efficiently generating the hydrogen that the temperature of the catalyst within the hydrogen supplying apparatus 12 always exists within a predetermined temperature range at a time of generating the hydrogen from the hydrogenating medium.

Figure 5:
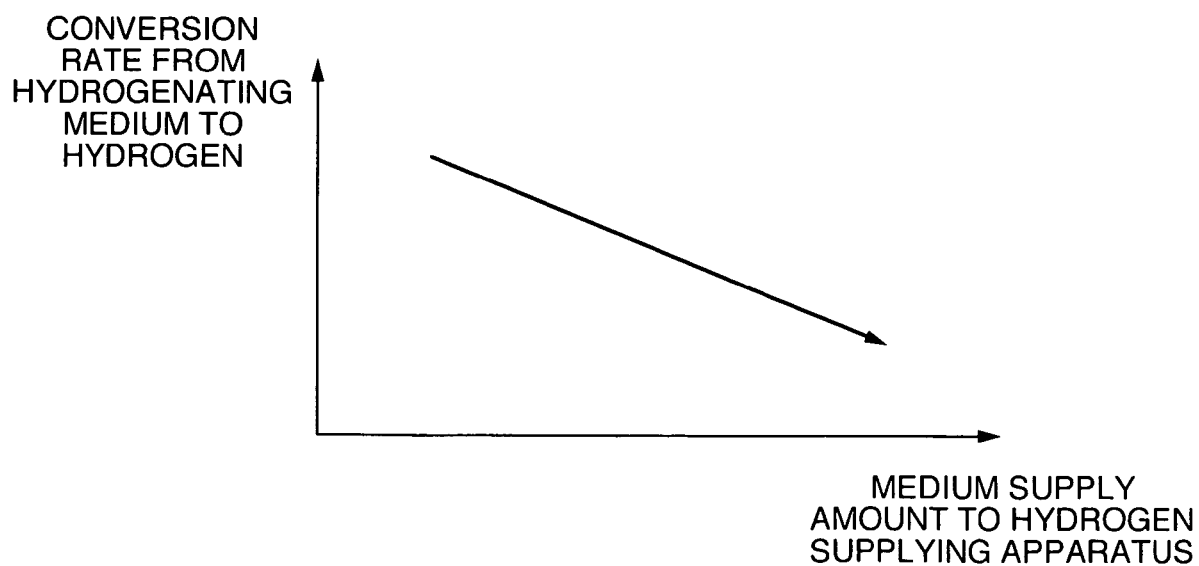
FIG. 5 is a view of a relation between a hydrogenating medium supplying amount to the hydrogen supplying apparatus and the conversion rate.

The temperature of the catalyst within the hydrogen supplying apparatus 12 depends on a heat supply amount to the hydrogen supplying apparatus 12, and a reaction heat quantity for generating the hydrogen from the hydrogenating medium. The temperature of the catalyst within the hydrogen supplying apparatus 12 is increased in proportion to the heat supply amount to the hydrogen supplying apparatus 12. On the contrary, in the case that the reaction for generating the hydrogen from the hydrogenating medium is an endothermic reaction, the catalyst temperature mentioned above is lowered in correspondence to the reaction heat quantity. For example, in the case that the methyl cyclohexane is used for the hydrogenating medium, an absorbed heat amount of about 70 kJ is necessary under a room temperature and a normal pressure for generating 1 mol of hydrogen. FIG. 5 shows a relation between the hydrogenating medium supply amount to the hydrogen supplying apparatus 12 and the conversion rate of generating the hydrogen from the hydrogenating medium in the case that the heat supply amount to the hydrogen supplying apparatus 12 is fixed. If the hydrogenating medium supply amount to the hydrogen supplying apparatus 12 is increased, it is known that the conversion rate from the hydrogenating medium to the hydrogen is lowered. This is mainly because the reaction heat quantity at a time of generating the hydrogen is increased in accordance with the increase of the medium supply amount to the hydrogen supplying apparatus 12, and the catalyst temperature is lowered. In other words, in order to set the catalyst temperature in the predetermined temperature range, it is important to control the hydrogenating medium supply amount to the hydrogen supplying apparatus 12 which determines the heat supply amount to the hydrogen supplying apparatus 12 and the reaction amount for generating the hydrogen.

Next, a description will be given of an estimating method of a catalyst temperature. There is a method of directly measuring the catalyst temperature by using the temperature detecting means 31 described in FIG. 1, or a method of measuring a temperature near the catalyst within the hydrogen supplying apparatus 12 so as to estimate the temperature. Further, there is a method of estimating the catalyst temperature on the basis of respective engine exhaust gas temperatures in an upstream side and a downstream side of the hydrogen supplying apparatus 12 measured by the temperature detecting means 14 and 19, a heat transfer rate into the hydrogen supplying apparatus 12 calculated in accordance with an engine operation condition (an engine speed, an engine torque, an intake air amount, a throttle opening degree, a fuel flow rate and the like), and a supply amount of the hydrogenating medium supplied to the hydrogen supplying apparatus 12. A description will be given of the catalyst temperature estimating means within the hydrogen supplying apparatus 12. The catalyst temperature is obtained by the following function.

$$T = f(Q1, \lambda1, \alpha, t, A, T1)$$

In the expression, T denotes a catalyst temperature within the hydrogen supplying apparatus 12, Q1 denotes a reaction heat at a time of generating the hydrogen rich gas, $\lambda1$ denotes a heat conduction rate of the member within the hydrogen supplying apparatus 12, $\alpha$ denotes a heat transfer rate from the exhaust gas to the hydrogen supplying apparatus 12, t denotes a thickness from an exhaust gas contact portion to a catalyst surface, A denotes an exhaust gas contact area, and T1 denotes an exhaust gas temperature.

$\lambda1$, t and A mentioned above depend on the structure of the hydrogen supplying apparatus 12. Q1 denotes a reaction heat at a time of generating the hydrogen rich gas, and depends on the supply amount of the hydrogenating medium supplied to the hydrogen supplying apparatus 12. Since the exhaust gas temperature T1 corresponds to an average temperature of the exhaust gas passing through the inner side of the hydrogen supplying apparatus 12, it employs an average value of the temperature detecting means 14 and 19. A Reynolds number, a Prandtl number and a heat conduction rate of the exhaust gas are calculated on the basis of the measured T1, the exhaust gas component estimated on the basis of the operation state of the engine and the exhaust gas flow rate, and the value a is determined. In other words, if the engine operation state, the exhaust gas temperature and the hydrogenating medium supply amount to the hydrogen supplying apparatus 12 are determined, the value T can be estimated.

Figure 6:
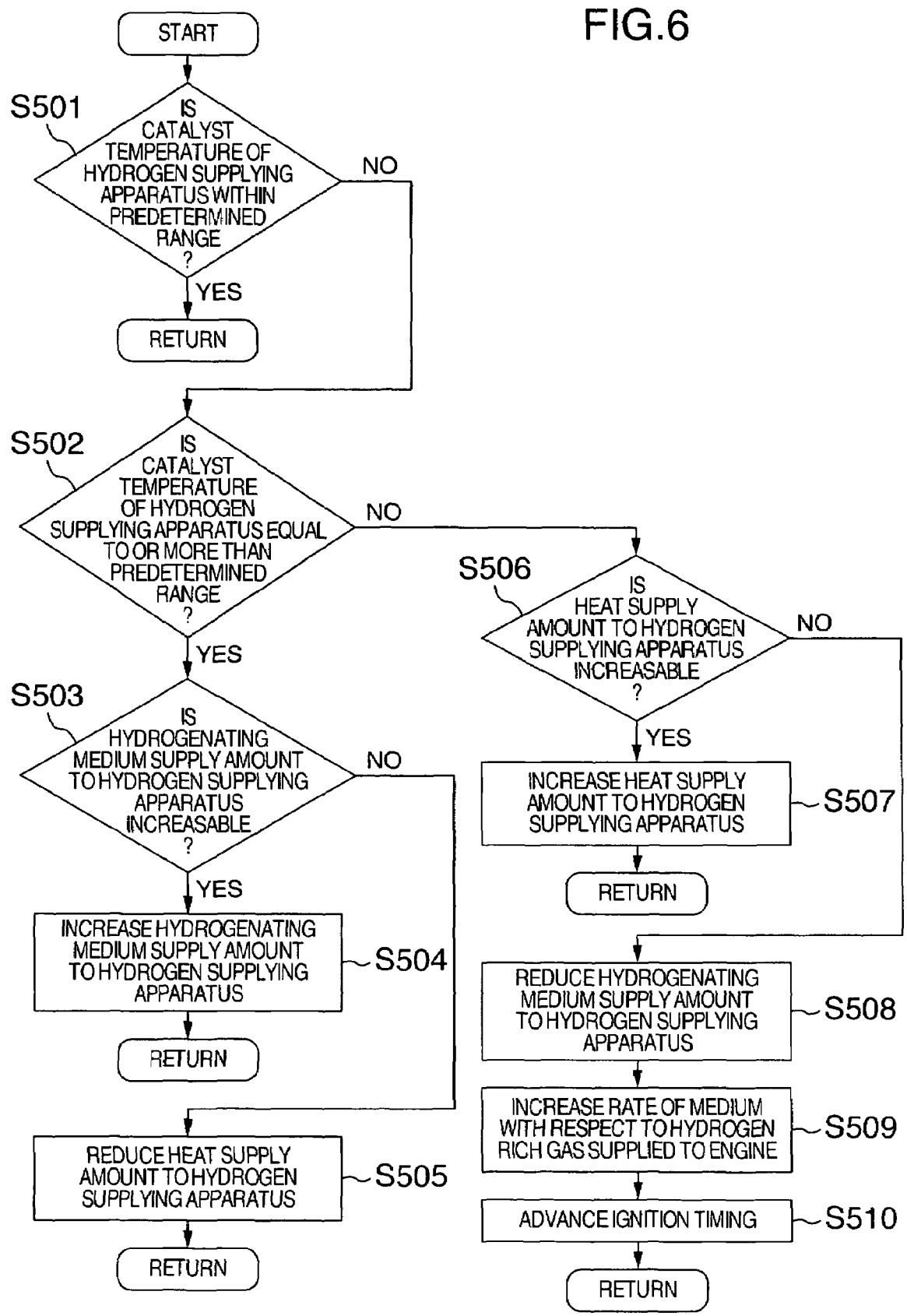
FIG. 6 is a control flow chart in accordance with a catalyst temperature change of the hydrogen supplying apparatus.

FIG. 6 shows a view of a system flow for measuring or estimating the catalyst temperature within the hydrogen supplying apparatus 12 by using the catalyst temperature estimating method mentioned above and controlling the catalyst temperature within a predetermined temperature range on the basis thereof. In a step S501, the step searches whether or not the measured or estimated catalyst temperature T within the hydrogen supplying apparatus 12 exists within the predetermined range. At this time, in the case that it is out of the predetermined range, the step judges in a step S502 whether or not the catalyst temperature T is higher than a predetermined range. The process of the steps S501 and S502 are based, for example, on the temperature detected by the temperature detecting means 14, 19, 31 and the like, the catalyst temperature T is determined by the control apparatus 23 and is judged whether or not it exists within the predetermined temperature range. In the case that an organic hydride such as a methyl cyclohexane or the like is employed for the medium, it is preferable to set the catalyst temperature to a predetermined temperature range between 250 and 400° C. If the catalyst temperature is higher than the predetermined temperature range in the step S502, the step judges in a step S503 whether or not it is possible to increase the hydrogenating medium supply amount to the hydrogen supplying apparatus 12. The judging means judges, for example, on the basis of the storage amount of the hydrogen rich gas storage apparatus 26 in FIG. 1. The storage amount of the hydrogen rich gas storage apparatus 26 can be detected by the hydrogen pressure sensor 5 and the hydrogen concentration sensor 6, and the storage amount can be judged by the control apparatus 23 on the basis of the result of detection. If it is possible to increase the hydrogenating medium supply amount in the step S503, the step increases the hydrogenating medium supply amount to the hydrogen supplying apparatus 12 from the medium supplying apparatus 11 in a step S504. Accordingly, the endothermic reaction amount is increased at a time of generating the hydrogen, whereby the catalyst temperature is lowered. On the other hand, in the case that the step judges in the step S503 that it is impossible to increase the hydrogenating medium supply amount, the step reduces the heat supply amount to the hydrogen supplying apparatus 12 in a step S505. As a method of controlling the supply amount of the heat supplied to the hydrogen supplying apparatus 12, there are, for example, (1) a method of reducing the flow rate of the exhaust gas supplied to the hydrogen supplying apparatus 12 from the engine 1 by using the exhaust gas amount adjusting valve 15, (2) a method of quickening the ignition timing by the spark plug 21 within the engine 1, and (3) a method of slowing the opening timing of the exhaust valve 20, as shown in FIG. 7. In the control methods (2) and (3), since it is possible to control without newly setting any auxiliary device as the engine system, it is possible to simplify the system. Further, in comparison with the control methods (2) and (3), in accordance with the control method (1), since the flow rate of the exhaust gas supplied to the hydrogen supplying apparatus may be adjusted, for example, by branching the piping, it is possible to control the catalyst temperature without affecting the engine. Further, as the other control method, there is (1) a method of reducing the combustion amount of the burning hydrogen rich gas or the medium by using a combustor such as a burner or the like installed in the hydrogen supplying apparatus 12, or (5) a method of reducing the supply amount of the heat generated from the heat source such as the inverter or the like mounted on the motor vehicle to the hydrogen supplying apparatus 12. In addition, there can be considered (6) a method of reducing the supply electric power of the heater installed in the hydrogen supplying apparatus 12.

The control methods (4) to (6) can control the catalyst temperature without affecting the engine in the same manner as the method (1). It is possible to lower the catalyst temperature by executing any one of these methods, or a plurality methods thereof.

On the other hand, in the case that the step judges in the step S502 that the catalyst temperature of the hydrogen supplying apparatus 12 is equal to or less than the predetermined temperature, the step judges in a step S506 whether or not it is possible to increase the heat supply amount to the hydrogen supplying apparatus 12. In the case that it is possible to increase the heat supply amount, the heat supply amount is increased in accordance with a method shown in FIG. 7, in the same manner as mentioned above. In the case that it is impossible to increase the heat supply amount in the step S506, for example, in the case that the engine is required a high torque by the user, it is hard to slow the ignition timing by the spark plug 21 and quicken the opening timing of the exhaust valve 20. Further, in the case that the storage amount of the medium or the hydrogen rich gas is small, it is hard to increase the heat supply by the combustion gas generated by using the burner or the like. Further, in the case that a remaining amount of the battery is small, it is hard to increase a heating amount generated by the heater. In the case mentioned above, the catalyst temperature is increased by reducing the supply amount of the hydrogenating medium supplied to the hydrogen supplying apparatus 12 in the step S508 and lowering the heat absorbing amount at a time of generating the hydrogen. At this time, since the hydrogen rich gas storage amount is lowered, the medium amount with respect to the hydrogen rich gas amount supplied to the engine is increased in a step S509.

Further, the ignition timing is advanced in accordance therewith as described in a step S510. This is because the burning speed of the hydrogen is higher than the burning speed of the medium. Further, in order to stabilize the combustion, the opening degree of the throttle valve 4 may be adjusted and the rate between the fuel and the air may be controlled. Further, at this time, the ignition timing of the fuel may be controlled.

Figure 8:
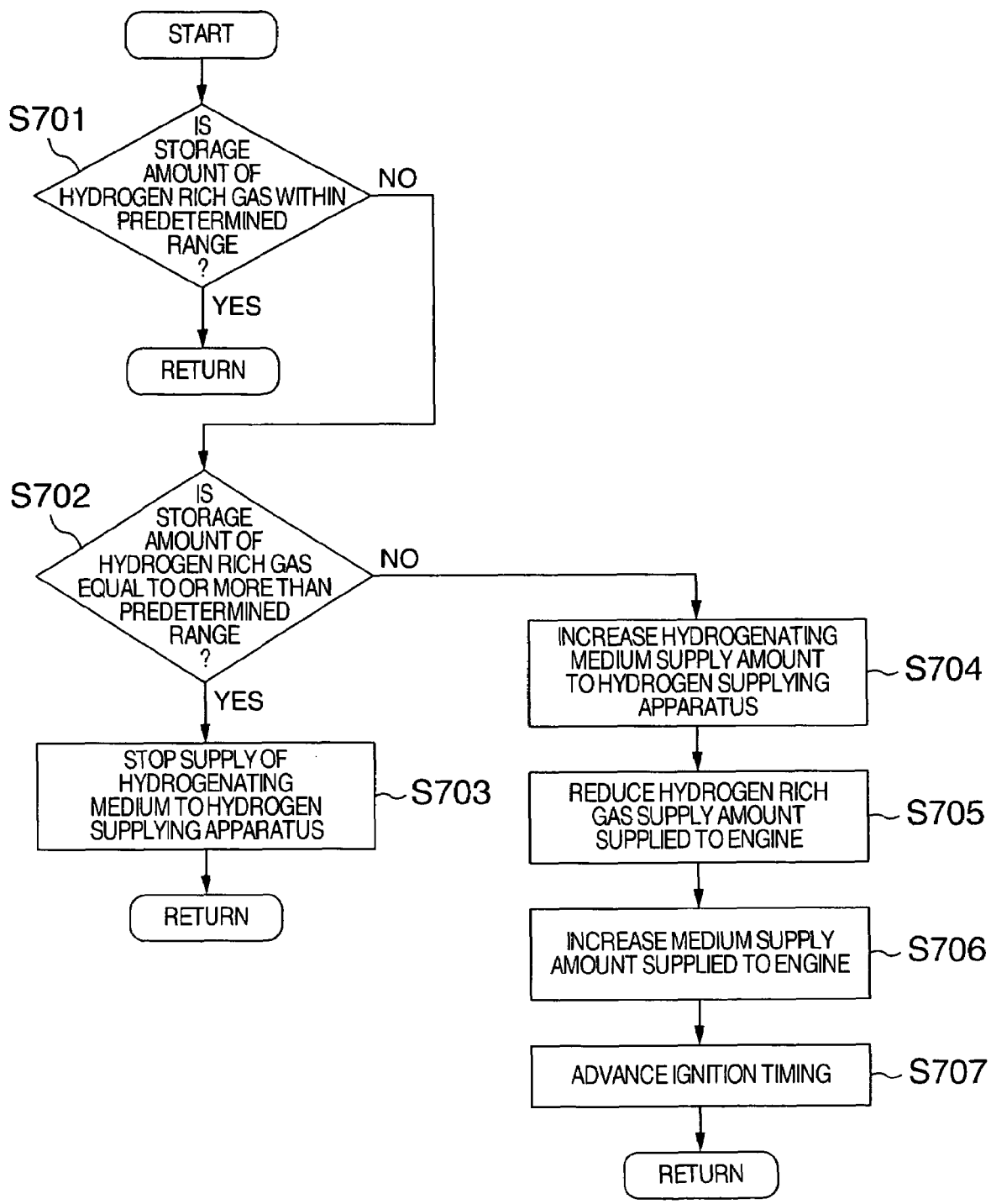
FIG. 8 is a control flow chart in accordance with a storage amount change of a hydrogen rich gas.

Next, a description will be given of a control content relating to the storage amount of the hydrogen rich gas with reference to FIG. 8. In a step S701, the step detects the storage amount of the hydrogen rich gas within the hydrogen rich gas storage apparatus 26 in FIG. 1 by the hydrogen pressure sensor 5 or the hydrogen concentration sensor 6, and judges on the basis of the detected value whether or not a predetermined storage amount is achieved by the control apparatus 23. At this time, for example, since it is desirable that a pressure P1 of the hydrogen rich gas supplied to the engine 1 is fixed, it is necessary to make a pressure P2 within the hydrogen rich gas storage apparatus 26 higher than the pressure P1. Further, if the pressure within the hydrogen rich gas storage apparatus 26 becomes inversely equal to or more than the predetermined pressure, there is a problem that the storage apparatus is broken or leaked, or it is hard to adjust the pressure P1 of the hydrogen rich gas supplied to the engine 1. In the case that the storage amount of the hydrogen rich gas is out of the predetermined range in the step S701, the step judges in a step S702 whether or not it is equal to or more than a predetermined range. In the case that it is equal to or more than the predetermined range, the step reduces the hydrogenating medium supply amount to the hydrogen supplying apparatus 12, and reduces the hydrogen rich gas generating amount. On the contrary, in the case that the hydrogen rich gas is equal to or less than the predetermined range in the step S702, the step increases the hydrogenating medium supply amount to the hydrogen supplying apparatus in a step S704. In a step S705, the step reduces the supply amount of the hydrogen rich gas supplied to the engine, and the step increases the supply amount of the medium supplied to the engine in a step S706. At this time, in order to control the combustion of the engine, the ignition timing by the spark plug 21 is controlled so as to be advanced. In this case, at this time, in the case that the catalyst temperature of the hydrogen supplying apparatus 12 is equal to or less than the predetermined temperature, the step does not increase the hydrogenating medium supply amount to the hydrogen supplying apparatus 12 in the step S704, but the step inhibits the supply of the hydrogen rich gas to the engine in the step S705.

Figure 9:
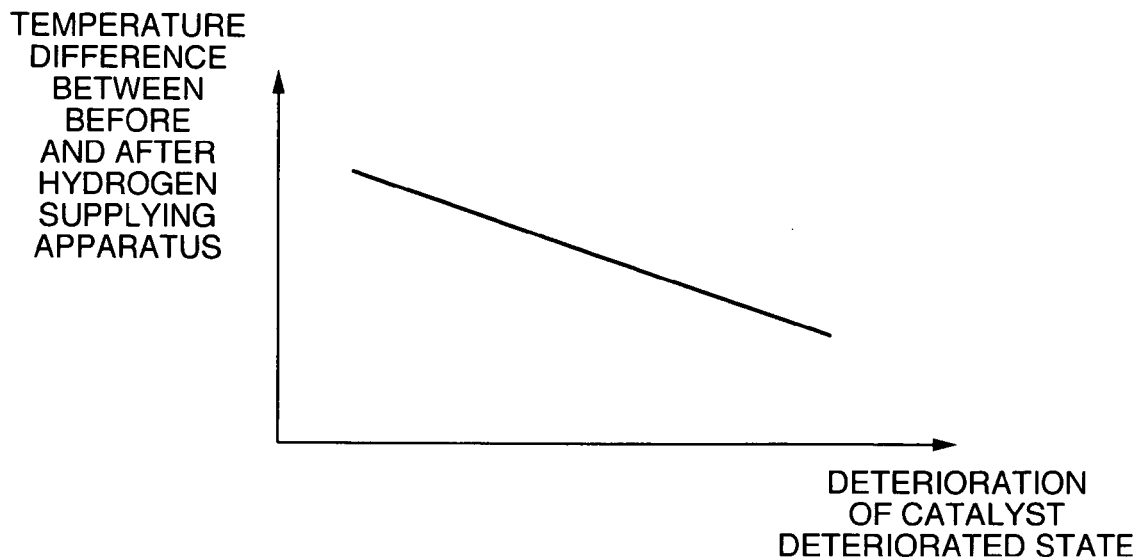
FIG. 9 is a view judging a catalyst deterioration within the hydrogen supplying apparatus.

Next, a description will be given of a means assuming a deterioration of the catalyst within the hydrogen supplying apparatus 12 and estimating a deterioration state. Under a condition that the heat supply amount to the hydrogen supplying apparatus 12 is fixed (for example, the rotational speed and the torque of the engine 1 are fixed), and under a condition that the hydrogenating medium supply amount to the hydrogen supplying apparatus 12 is fixed, there is calculated a temperature difference between the exhaust gas temperatures detected by the temperature detecting means 14 in the upstream side of the hydrogen supplying apparatus 12 and the temperature detecting means 19 in the downstream side thereof. As shown in FIG. 9, under the condition mentioned above, if the catalyst within the hydrogen supplying apparatus 12 is deteriorated, the temperature difference mentioned above becomes smaller. Accordingly, if the temperature difference of the exhaust gas temperatures becomes equal to or less than a predetermined value, there can be considered that the catalyst deterioration is generated within the hydrogen supplying apparatus 12. This is because the reaction conversion rate generating the hydrogen from the hydrogenating medium becomes lower due to the deterioration of the catalyst, and the heat absorbing amount at a time of reacting becomes lower. Accordingly, the exhaust gas temperature difference between before and after the hydrogen supplying apparatus 12 becomes smaller. Therefore it is possible to judge the deteriorated state. Further, for example, when the user intends to stop the operation of the engine 1, that is, in the case that the control apparatus 23 receives the engine stop signal, the deterioration judging means mentioned above does not immediately stop the engine 1, but operates the engine 1 at a fixed rotational speed and a fixed torque, and detects the temperature by the temperature detecting means 14 and 19 so as to judge. If the deteriorated state becomes a predetermined level or more, it is necessary to give a warning against the user by a lamp or the like so as to urge the user to replace the hydrogen supplying apparatus 12. Accordingly, it is possible to obtain an effect of preventing the exhaust amount of CO2 discharged from the engine 1 from being increased. Further, if the deteriorated state is judged as mentioned above, it is necessary to increase the supply amount of the hydrogenating medium supplied to the hydrogen supplying apparatus 12 while taking the deteriorated state into consideration. Accordingly, it is possible to operate without deteriorating the vehicle driving performance required by the user.

As mentioned above, it is possible to execute an optimum hydrogen supply control in correspondence to the deteriorated state by estimating the deteriorated state of the catalyst, even if the deterioration is generated in the catalyst.

Figure 10:
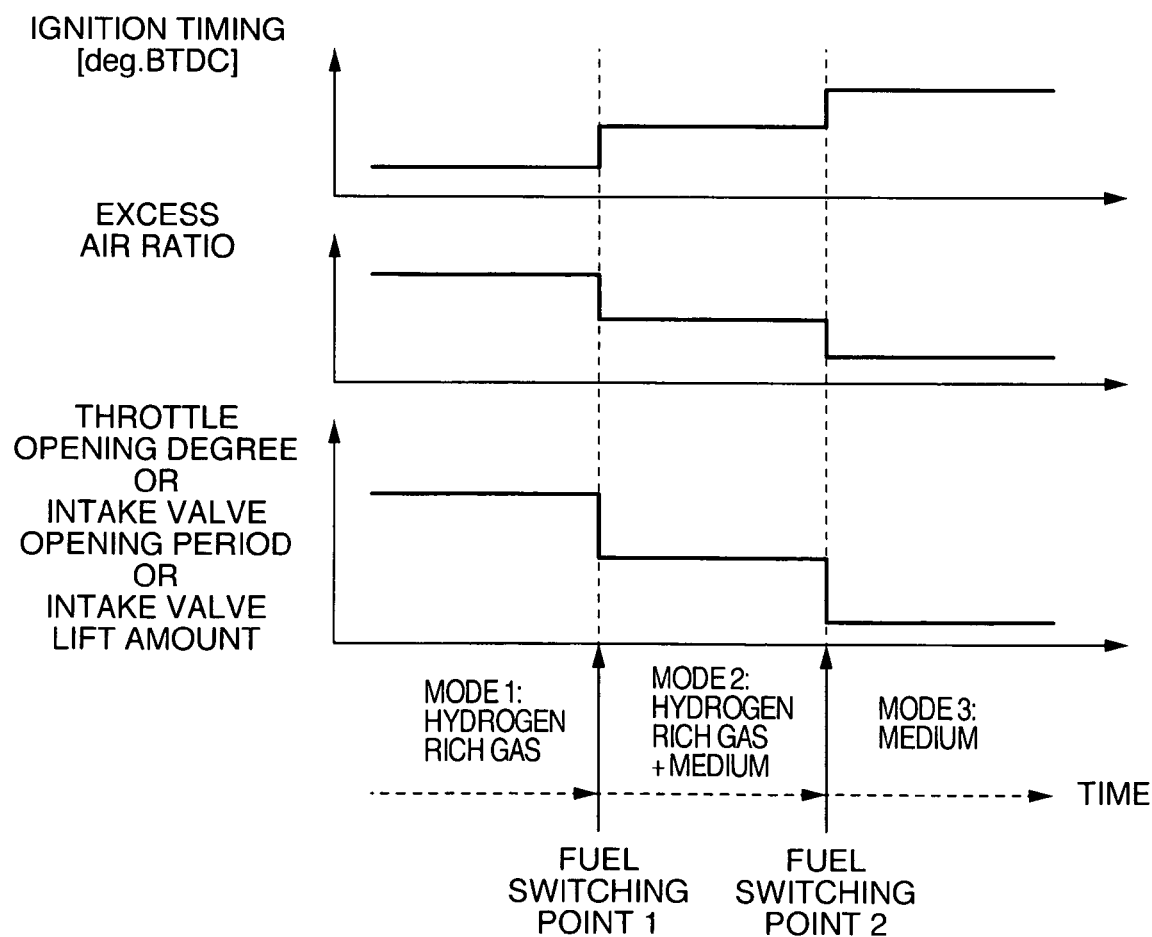
FIG. 10 is a view showing a control of an air fuel ratio and an ignition timing executed at a time of switching a fuel.

Next, a description will be given of a control method at a time of switching the kind of the fuel supplied to the engine 1. As described in FIG. 10, it is necessary to control an ignition timing, or an excess air ratio in correspondence to the kind of the fuel supplied to the engine 1. For example, at a time of switching the fuel supplied to the engine from the hydrogen rich gas in the mode 1 to the mixed fuel of the hydrogen rich gas and the medium in the mode 2, and at a time of switching from the mode 1 or the mode 2 to the medium fuel in the mode 3, it is necessary to control the throttle valve 4 or the intake valve 22 in such a manner that the excess air ratio becomes lower. At this time, the EGR amount may be controlled. With regard to the ignition timing, it is necessary to advance so as to obtain a minimum spark advance for best torque (MBT). At this time, it is necessary to control the total calorific power of the fuel supplied to the engine 1 before and after switching so as to prevent the torque fluctuation from being generated, in such a manner that a wide change is not generated. Since the hydrogen has a high burning speed (about 8 times of the gasoline), and can achieve the lean burn (maximum excess air ratio of hydrogen: 10.5 and maximum excess air ratio of gasoline: 1.4), a high-efficiency operation can be executed by advancing the ignition timing in accordance with the reduction of the rate of the hydrogen rich gas in the fuel supplied to the engine 1, or making the excess air ratio small.

Figure 11:
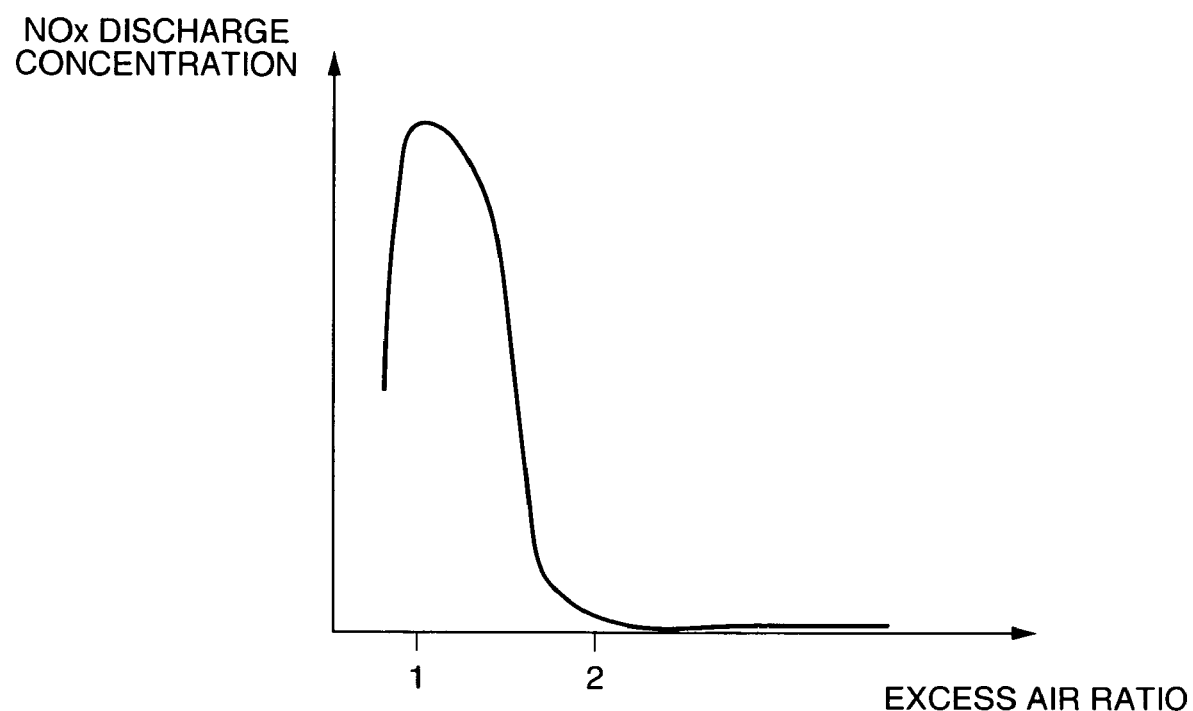
FIG. 11 is a view of a relation between an excess air ratio and an NOx discharging amount at a time of burning the hydrogen rich gas.
Figure 12:
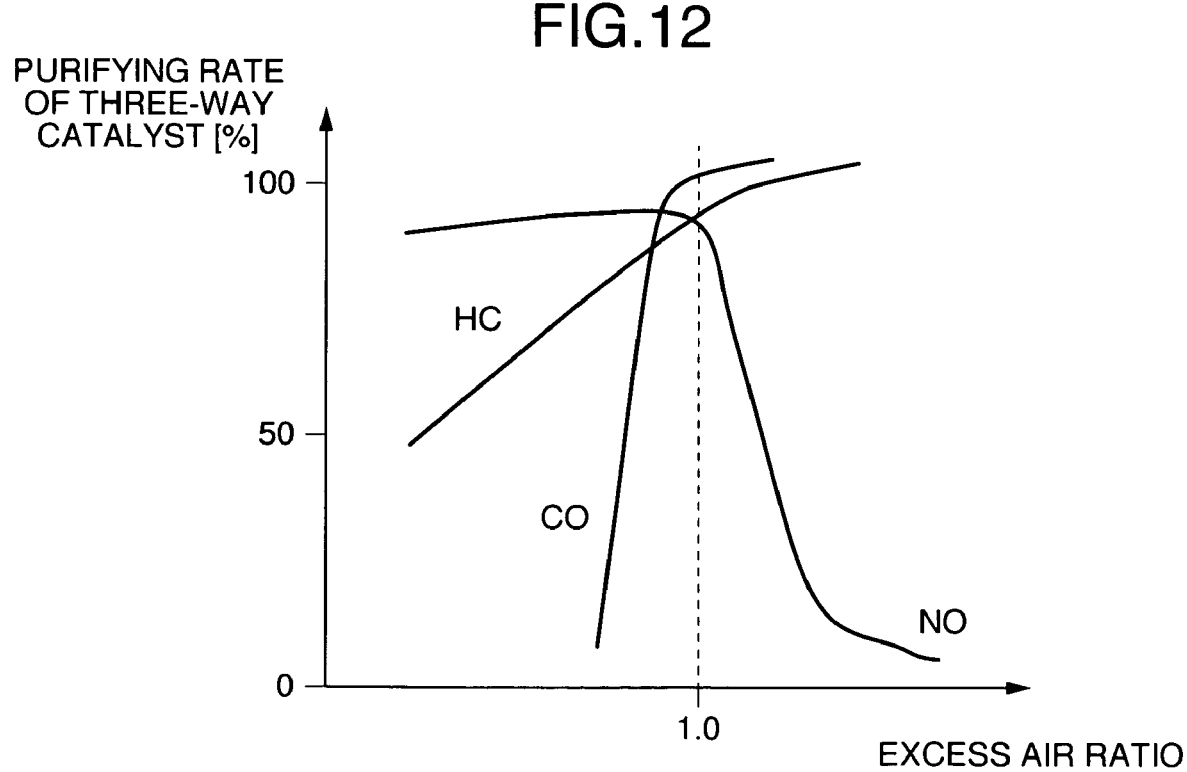
FIG. 12 is a view of a relation between a purifying rate of a three-way catalyst and the excess air ratio.

Next, a description will be given of a method of operating while taking an exhaust gas performance into consideration. In the case of only the hydrogen rich gas in the mode 1 in FIG. 10, a lot of NOx is discharged at a time when the excess air ratio is equal to or less than 1.8 as shown in FIG. 11. Accordingly, in the mode 1, the operation is executed at the excess air ratio equal to or more than 1.8, more preferably equal to or more than 2. Further, taking the efficiency of the engine into consideration, it is preferable that an upper limit of the excess air ratio is set to 5.0. Further, in the modes 2 and 3, since the medium is supplied, an unburned hydrocarbon and CO are discharged in addition to NOx. The unburned hydrocarbon and CO are purified by using the three-way catalyst for the purifying catalyst 13, however, it is necessary to operate at that time while taking a purifying characteristic shown in FIG. 12 into consideration. In other words, since both of the hydrogen rich gas and the medium are supplied in the mode 2, it is possible to execute the lean burn, however, since the characteristics in FIGS. 11 and 12 are employed, NOx is discharged without being purified in the case of being operated under the excess air ratio in the range between 1.2 and 1.8. Accordingly, in the case of being operated in the mode 2, it is desirable to operate at the excess air ratio between 0.95 and 1.05, preferably between 1.0 or 1.8 and 5.0. In the mode 3, it is preferable to operate at the excess air ratio between 0.95 and 1.05, preferably 1.0.

In the control of the excess air ratio, as shown in FIG. 11, it is possible to lower the excess air ratio by making the throttle opening degree smaller. Further, in the case that the variable valve is mounted on the intake valve of the engine, it is possible to lower the excess air ratio by making the opening period or the lift amount of the intake valve small.

As mentioned above, a high exhaust gas performance can be maintained by controlling the excess air ratio in correspondence to the fuel component supplied to the engine 1, without depending on the fuel component supplied to the engine 1.

Next, a description will be given of a mounting position of the three-way catalyst 13 and the hydrogen supplying apparatus 12 to the exhaust pipe 18. Because of the endothermic reaction, when the hydrogen supplying apparatus 12 generates the hydrogen from the hydrogenating medium, an outlet exhaust gas temperature is lowered in comparison with an inlet exhaust gas temperature of the hydrogen supplying apparatus 12. On the other hand, since the three-way catalyst 13 executes an exothermic reaction, an outlet temperature is increased in comparison with a three-way catalyst inlet temperature. In view of these features, in order to improve the response rate of both of the hydrogen supplying apparatus 12 and the three-way catalyst 13, it is desirable that the three-way catalyst 13 is installed in the upstream side (the engine side) of the hydrogen supplying apparatus 12. Further, in order to improve a mounting property to the motor vehicle and both the reaction rates, the hydrogen supplying apparatus 12 and the three-way catalyst 13 may be formed as an integral structure. As the integral structure of the hydrogen supplying apparatus 12 and the three-way catalyst 13, for example, there can employed a structure in which the three-way catalyst is arranged in an opposite side surface to the catalyst layer 42 of the high heat conduction substrate 40 of the hydrogen supplying apparatus 12 shown in FIG. 12. Further, in order to enlarge a contact area between the three-way catalyst and the exhaust gas, there can be employed a structure obtained by laminating the three-way catalyst, the high heat conduction substrate 40, the catalyst layer 42, the hydrogen separating film 38, the spacer 37, the hydrogen flow path 36, the spacer 37, the catalyst layer 42, the high heat conduction substrate 40 and the three-way catalyst in this order.

As mentioned above, it is possible to intend to improve the efficiency of the hydrogen supply and the purifying performance of the exhaust gas, by arranging the hydrogen supplying apparatus 12 and the three-way catalyst 13.

Figure 13:
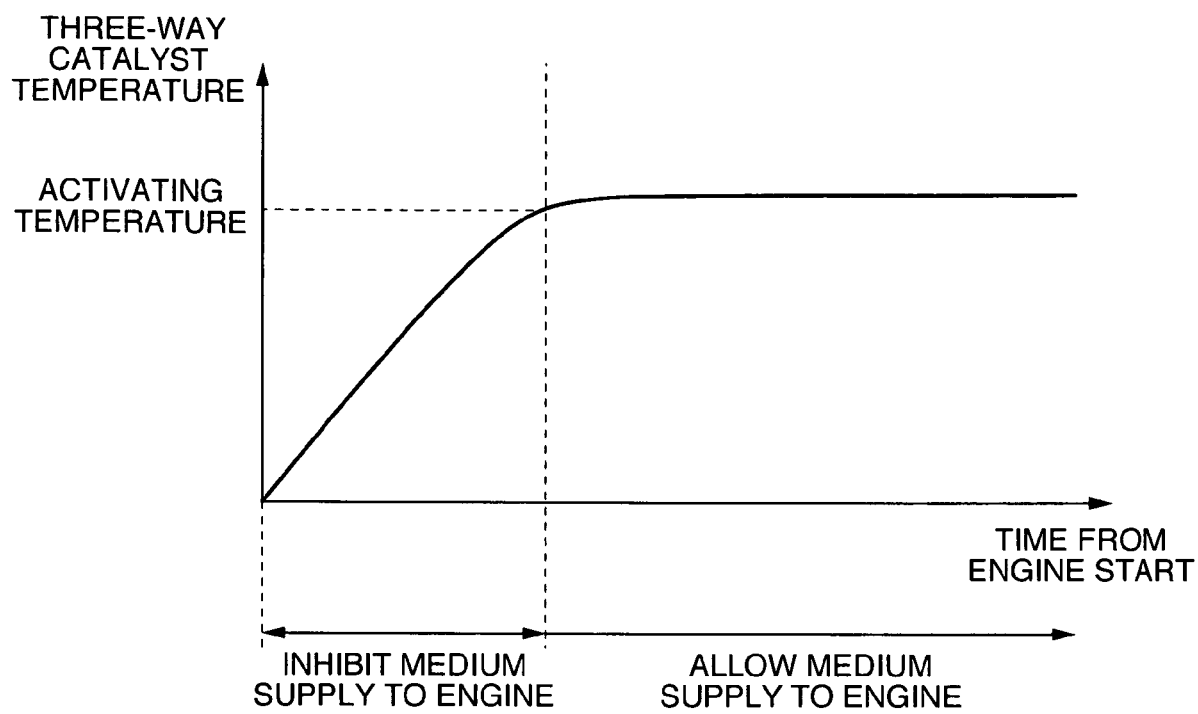
FIG. 13 is a view of a catalyst temperature change until the engine is activated to the three-way catalyst after starting.

Next, a description will be given of an operating method at a time of starting by exemplifying the case that the three-way catalyst is used as the purifying catalyst 13. As shown in FIG. 13, the three-way catalyst 13 is at a low temperature at a time of starting, and the temperature of the three-way catalyst 13 is increased as time goes on after starting. The three-way catalyst is activated at 300° C. or more. Accordingly, a predetermined time is required until the three-way catalyst 13 is activated. If the hydrocarbon medium is supplied to the engine before being activated, the three-way catalyst 13 does not purify the exhaust gas, and the unburned hydrocarbon, the carbon oxide, NOx and the like are discharged. Therefore, it is necessary to make an amount of the medium of the hydrocarbon medium supplied to the engine as small as possible, until the three-way catalyst 13 reaches an activated temperature. In other words, it is necessary to execute the engine combustion by setting the hydrogen rich gas as a main component so as to reduce the exhausting amount of the unburned exhaust gas. In order to execute the control mentioned above, it is necessary to estimate the catalyst temperature of the three-way catalyst 13. The estimating means estimates the heat quantity supplied to the three-way catalyst 13 after the engine 1 is started, for example, on the basis of a water temperature of the engine 1, an intake air amount to the engine 1, and the vehicle speed. Further, it is possible to estimate the temperature of the three-way catalyst 13 by taking into consideration a time after the stop of the engine 1 to the start of the engine 1. The temperature of the three-way catalyst may be detected directly by installing the temperature detecting apparatus in the three-way catalyst 13.

Further, since it is necessary to supply the hydrogen rich gas to the engine 1 at a time of starting, in order to execute the control, it is necessary to store a predetermined amount of hydrogen rich gas in the hydrogen rich gas storage apparatus 26. Generally, a lot of HC and CO are discharged at a time of starting the engine. Especially, since the fuel is injected more than necessary at a time of starting, a lot of HC and CO are discharged just after starting. Since the hydrogen rich gas corresponds to a gas fuel and can execute the lean burn, it is possible to start by a small amount of fuel and it is possible to widely reduce HC and CO if the hydrogen rich gas is used at a time of starting. Accordingly, it is important to store the hydrogen rich gas necessary for starting at least the engine 1 in the hydrogen rich gas storage apparatus 26. Desirably, the hydrogen rich gas necessary for operating the engine only by the hydrogen rich gas is stored in the hydrogen rich gas storage apparatus 26, until the three-way catalyst 13 is activated. In the case that the control apparatus 23 receives the engine stop signal at a time when the user shows an intention of stopping the engine 1, the hydrogen pressure sensor 5 and the hydrogen concentration sensor 6 detect whether or not the hydrogen rich gas storage amount within the hydrogen rich gas storage apparatus 26 is equal to or more than the predetermined amount so as to execute the judgment. In the case that the necessary hydrogen rich gas is not stored in the hydrogen rich gas storage apparatus 26 at a time of starting the engine 1, the hydrogen rich gas is generated by supplying the hydrogenating medium to the hydrogen supplying apparatus 12 without stopping the engine 1. At this time, the hydrogen rich gas may be generated by stopping the engine 1 and supplying the heat to the hydrogen supplying apparatus 12 from the other than an engine waste heat.

Since the necessary fuel amount at a time of starting the engine is reduced in addition that the exhaust performance at a time of starting the engine is improved in comparison with the case that only the medium is supplied to the engine, on the basis of the execution of the control mentioned above, the fuel consumption is improved.

Next, a description will be given of a high-efficiency burning method using the hydrogen supplying apparatus 12. FIG. 14 shows a structure thereof. A difference from the structure in FIG. 1 exists in a point that the medium supplying apparatus 3 is structured such as to directly inject into the engine combustion chamber. The other structures are the same as those of FIG. 1, and are denoted by the same reference numerals. In the present system, a basic structure is formed such that the hydrogen rich gas generated by the hydrogen supplying apparatus 12 is injected to the intake pipe 27. Further, the structure may be made such that the hydrogen rich gas generated by the hydrogen supplying apparatus 12 is directly injected into the engine cylinder. The present system corresponds to a system which supplies the hydrogen rich gas to the engine earlier than the injection of the medium mentioned above, directly injects the medium mentioned above into the cylinder during a piston compression period, and executes an autoignition combustion of the medium mentioned above. In a normal auto compression ignition combustion, a compression ratio is high and a high-efficient combustion can be executed, however, an air fuel mixture which is locally too rich exists due to a diffusion combustion, and a soot is generated at a time of burning. Further, the combustion temperature is non-uniform, and NOx is generated from the high temperature portion. In the present system, since the hydrogen rich gas is supplied into the engine before the auto compression ignition combustion of the medium, there is obtained a feature that the hydrogen catches fire and self-ignites in accordance with the autoignition combustion of the medium, thereby improving the combustion efficiency of the medium. Accordingly, it is possible to reduce the discharge of the soot. This is because the hydrogen has a wide combustible range in comparison with the medium mentioned above, and has a high burning speed, thereby promoting the combustion of the medium mentioned above. Further, an EGR limit becomes wider, the combustion temperature becomes lower, and it is possible to reduce the NOx discharge amount in accordance with this. In order to execute the burning method mentioned above, it is desirable to employ a material having a great hydrogen generating amount and a high autoignition performance such as a Decalin for the medium.

Figure 15:
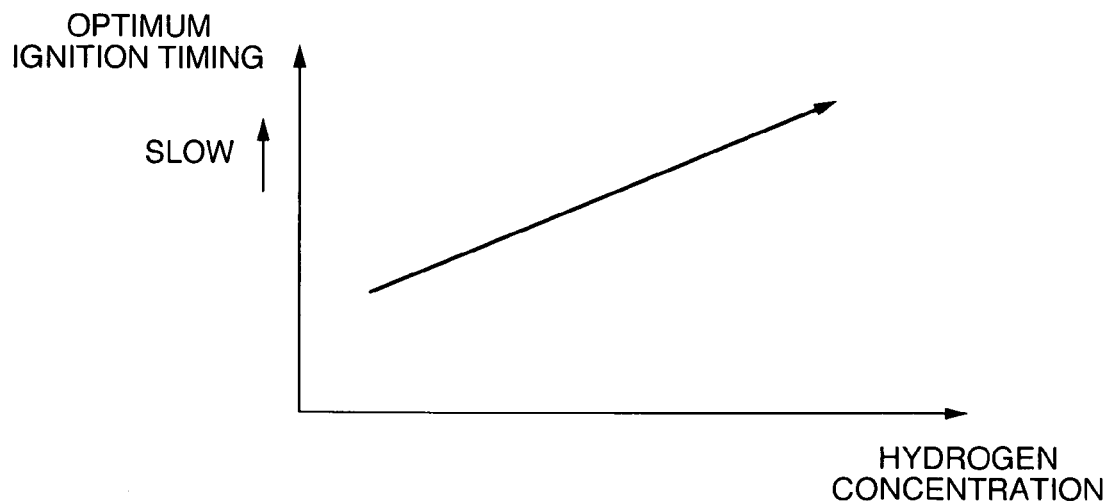
FIG. 15 is a view of a relation between a hydrogen concentration and an ignition timing.

Next, a description will be given of an operating method taking into consideration a change of the concentration of the hydrogen rich gas after separating the hydrogen rich gas generated from the hydrogen supplying apparatus 12 and the dehydrogenating medium by the separating apparatus 8 in correspondence to the operating state. The hydrogen concentration sensor 6 is installed within the hydrogen rich gas storage apparatus 26 so as to detect the concentration of the hydrogen supplied to the engine. Since the hydrogen concentration is detected and estimated as mentioned above, it is necessary to change the engine control such as the ignition timing or the like as occasion demands. For example, as described in FIG. 15, if the hydrogen concentration becomes higher, it is necessary to slow the optimum ignition timing. This is because the burning speed of the hydrogen is 7 to 8 times in comparison with the hydrocarbon fuel such as the gasoline or the like, and the optimum ignition timing slows in accordance with the increase of the hydrogen concentration. Therefore, it is possible to execute the combustion having a low exhaust gas and a high efficiency by detecting and estimating the hydrogen concentration, and controlling the timing of the ignition timing in correspondence thereto.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An engine system which mounts a medium chemically repeating a hydrogen absorption and a hydrogen desorption thereon, is provided with a hydrogen supplying apparatus generating or storing a hydrogen rich gas from said medium, and drives an engine by using said hydrogen rich gas as one of fuels, wherein an exhaust pipe of the engine is provided with said hydrogen supplying apparatus and a purifying catalyst for purifying an exhaust gas of the engine, and said purifying catalyst is installed closer to the engine than said hydrogen supplying apparatus, or said hydrogen supplying apparatus and said purifying catalyst are integrally formed, and wherein the engine system comprises:
a storage amount detecting means detecting a storage amount of said hydrogen rich gas stored in the storage apparatus;
a hydrogen rich gas storage amount detecting means judging whether or not the storage amount of said hydrogen rich gas detected by said storage amount detecting means is in a range of a predetermined value, at a time of receiving an engine stop signal; and
a medium supply means supplying said medium to said hydrogen supplying apparatus in the case that the storage amount of said hydrogen rich gas is judged to be equal to or less than a predetermined value by said hydrogen rich gas storage amount judging means.

* * * * *